United States Patent
Ojima

(10) Patent No.: US 10,656,289 B2
(45) Date of Patent: May 19, 2020

(54) SCINTILLATOR PLATE AND RADIATION DETECTOR USING SAME

(71) Applicant: CANON KABUSHIKI KAISHA, Tokyo (JP)

(72) Inventor: Tetsunori Ojima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/216,309

(22) Filed: Dec. 11, 2018

(65) Prior Publication Data

US 2019/0196029 A1 Jun. 27, 2019

(30) Foreign Application Priority Data

Dec. 21, 2017 (JP) ................. 2017-245449

(51) Int. Cl.
*G01T 1/202* (2006.01)
*G01T 1/20* (2006.01)

(52) U.S. Cl.
CPC ............ *G01T 1/2023* (2013.01); *G01T 1/202* (2013.01); *G01T 1/2002* (2013.01); *G01T 1/2018* (2013.01)

(58) Field of Classification Search
CPC ..... G01T 1/2002; G01T 1/2018; G01T 1/202; G01T 1/2023
See application file for complete search history.

(56) References Cited

U.S. PATENT DOCUMENTS

| 6,469,305 | B2* | 10/2002 | Takabayashi | G01T 1/2002 250/361 R |
| 7,692,152 | B2* | 4/2010 | Inoue | G01T 1/2018 250/361 R |
| 2012/0288688 | A1* | 11/2012 | Kug | G21K 4/00 428/177 |
| 2014/0001367 | A1* | 1/2014 | Anzai | G01T 1/2006 250/366 |
| 2016/0041278 | A1* | 2/2016 | Gorouya | G01T 7/00 250/366 |
| 2018/0031713 | A1* | 2/2018 | Ojima | G01T 1/202 |

FOREIGN PATENT DOCUMENTS

JP 2000-9845 A 1/2000

* cited by examiner

*Primary Examiner* — Marcus H Taningco
(74) *Attorney, Agent, or Firm* — Canon U.S.A.Inc., IP Division

(57) ABSTRACT

A protection film covering a scintillator has at least a plurality of metal atoms, an oxygen atom, and a hydrophobic functional group, a certain metal atom of the plurality of metal atoms is bonded to the other metal atom of the plurality of metal atoms through the oxygen atom, the hydrophobic functional group has a carbon atom, and the carbon atom is bonded to any one of the plurality of metal atoms.

15 Claims, 2 Drawing Sheets

SCINTILLATOR PLATE AND RADIATION DETECTOR USING SAME

BACKGROUND OF THE INVENTION

Field of the Invention

The present disclosure relates to a scintillator plate and a radiation detector provided with the scintillator plate.

Description of the Related Art

A radiation detector for use in an X-ray photography or the like in a medical field is provided with a scintillator plate having a scintillator receiving radiation and emitting fluorescence and a scintillator substrate holding the scintillator and a photoelectric conversion portion provided with a pixel detecting the fluorescence emitted by the scintillator. The pixel is a photoelectric conversion element receiving fluorescence, and then converting the fluorescence into an electrical signal. The scintillator has been demanded to efficiently transmit the emitted fluorescence to the light receiving surface of the pixel. As a method therefor, a method using scintillators having columnar structures (sometimes referred to as needlelike structures) is mentioned. The scintillators having the columnar structures have gaps formed between the columnar structures and the refractive index of a scintillator material is higher than the refractive index of air, and therefore fluorescence repeats reflection in the columnar structures. Therefore, it is said that fluorescence generated by radiation entering one end of the columnar structure propagates in the columnar structure to be emitted from the other end, and then effectively reaches the light receiving surface.

The columnar structure has a high aspect ratio and a very large specific surface area as compared with that of a plane film. As the scintillator materials, alkali halide crystals typified by CsI have been widely used but it is known that the alkali halide crystals exhibit deliquescence. Therefore, when exposed to the atmosphere, the scintillator containing an alkali halide columnar crystal is easily deliquesced by a water vapor contained in the atmosphere to deteriorate. In the deteriorated alkali halide, the generated fluorescence is dispersed before reaching the pixel, and therefore the spatial resolution of the radiation detector decreases. Then, in a scintillator panel described in Japanese Patent Laid-Open No. 2000-9845, the columnar structures of the scintillators are covered with a protection film containing polyparaxylylene, whereby the contact between the scintillators and the water vapor is prevented to suppress the deliquescence.

In order to cover the scintillators with the protection film containing polyparaxylylene to prevent the deliquescence of the scintillators as described in Japanese Patent Laid-Open No. 2000-9845, it is necessary to cover the scintillators with a thick protection film in such a manner as to fill the gaps between the columnar structures with the protection film. This is because, when the gap is present, the water vapor enters from the gap, and then the scintillator and the water vapor contact each other, so that the scintillator is deliquesced. However, when the protection film of the scintillators is thickened to fill the gaps between the columnar structures, the spatial resolution in the radiation detector decreases. When the fluorescence emitted from the scintillator is transmitted to the protection film, the fluorescence freely spreads in the protection film. Therefore, when a protection film layer is present between the scintillator and the photoelectric conversion portion, the fluorescence emitted from the scintillator spreads before reaching the photoelectric conversion portion when the film thickness of the protection film layer is larger. When the protection film is present so as to fill the gaps, the fluorescence emitted from a certain columnar structure is transmitted to the next columnar structure through the protection film, so that the fluorescence emitted from the scintillator spreads before reaching the photoelectric conversion portion. As a result, the spatial resolution of the radiation detector decreases. Consequently, the deterioration of the scintillator by the deliquescence is prevented by covering the scintillator with the protection film but a problem that the fluorescence generated in the scintillator spreads, so that the spatial resolution in the radiation detector decreases has occurred. In order to prevent the spatial resolution decrease, the protection film may be thinly formed so as not to fill the gaps between the columnar structures. However, when the thickness is small, a conventional protection film has not sufficiently exhibited the scintillator deliquescence prevention effect.

SUMMARY OF THE INVENTION

It is an aspect of the present disclosure to provide a scintillator plate in which the thickness of a protection film for preventing the deterioration of a scintillator having a columnar structure is reduced and the spread of fluorescence generated in the scintillator is suppressed. It is another aspect of the present disclosure to provide a radiation detector in which a high spatial resolution is obtained over a long period of time using the scintillator plate.

A first aspect of the present disclosure is a scintillator plate provided with a scintillator substrate, a scintillator formed on the scintillator substrate, and a protection film covering the scintillator, in which the scintillator has a plurality of crystal bodies of columnar structures projecting from the surface of the scintillator substrate, the protection film has at least a plurality of metal atoms, an oxygen atom, and a hydrophobic functional group, a certain metal atom of the plurality of metal atoms is bonded to the other metal atom of the plurality of metal atoms through the oxygen atom, the hydrophobic functional group has a carbon atom, and the carbon atom is bonded to any one of the plurality of metal atoms.

A second aspect of the present disclosure is a radiation detector provided with the scintillator plate and a photoelectric conversion portion.

Further features of the present disclosure will become apparent from the following description of exemplary embodiments with reference to the attached drawings.

DESCRIPTION OF THE EMBODIMENTS

Figure 1:
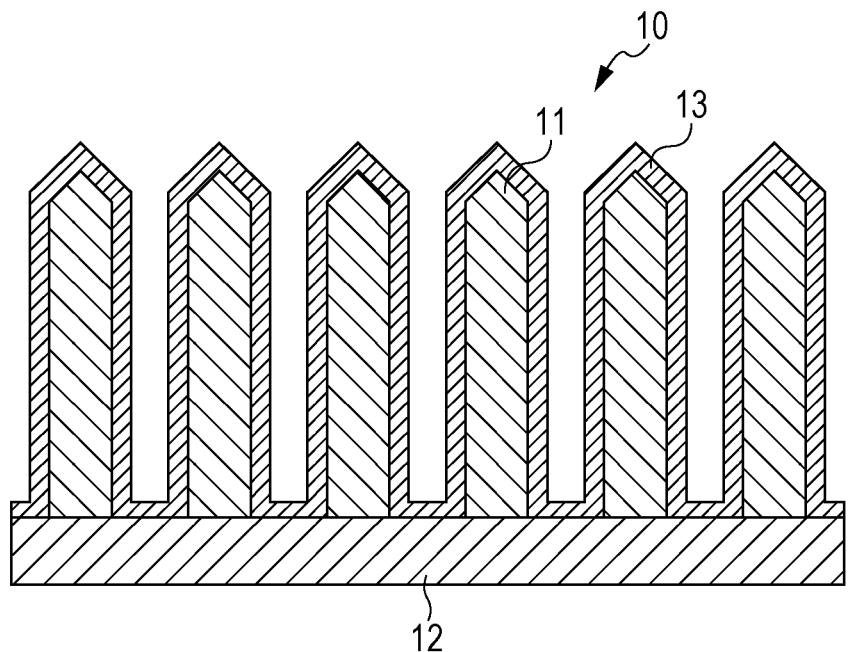
FIG. 1 is a cross-sectional schematic view of one embodiment of a scintillator plate of the present disclosure.

Hereinafter, an embodiment of the present disclosure is described in detail. However, the present invention is not limited to the embodiment described below. In the present disclosure, embodiments obtained by altering or modifying as appropriate, for example, the embodiment described below based on usual knowledges of persons skilled in the art without deviating from the gist are also included in the scope of the present disclosure. FIG. 1 illustrates a cross-sectional schematic view of one embodiment of a scintillator plate of the present disclosure. A scintillator plate 10 of the present disclosure has scintillators 11 receiving radiation and emitting fluorescence, a scintillator substrate 12 holding the scintillators 11, and a protection film 13 covering the scintillators 11. Hereinafter, each configuration of the scintillator plate 10 of this embodiment is more specifically described, and then a radiation detector using the scintillator plate 10 of this embodiment is described.

Protection Film

The scintillator plate 10 of the present disclosure has a feature that a protection film 13 covering the scintillators 11 has at least a plurality of metal atoms, an oxygen atom, and a hydrophobic functional group, in which a certain metal atom of the plurality of metal atoms is bonded to the other metal atoms through the oxygen atom. The hydrophobic functional group of the protection film 13 has a carbon atom. The carbon atom is bonded to any one of the plurality of metal atoms of the protection film 13. It has been clarified by an examination of the present inventors that the influence of water molecules on the scintillators 11 can be suppressed due to the feature even when the protection film 13 is thin. This is mainly based on two effects. The first effect is an effect that the crosslinking structure of the metal atoms via the oxygen atom in the protection film 13 suppresses the penetration of the water molecules in the protection film 13 by steric hindrance. The second effect is an effect that the inside of the protection film 13 becomes a hydrophobic environment by the hydrophobic group, so that the energy required for the penetration of the water molecules increases. Due to mainly these two multiple effects, even when the protection film 13 is thin, the penetration speed of the water molecules through the protection film 13 greatly decreases. The hydrophobic functional group contained in the protection film 13 is preferably 0.1 times or more and twice or less the metal atoms in terms of molar ratio. When the stoichiometric ratio of the hydrophobic functional group to the metal atoms is less than 0.1 times, the effect of the hydrophobic functional group is not sufficiently exhibited. When the stoichiometric ratio of the hydrophobic functional group to the metal atoms is larger than twice, the bond contributing to the film formation decreases, and therefore it becomes difficult to form a film as the protection film 13. The amount of the hydrophobic functional group contained in the protection film 13 can be qualitatively analyzed by FTIR (Fourier Transform Infrared Spectrum), TOF-SIMS (Time-of-Flight Secondary Ion Mass Spectrometry), or the like and can be quantitatively analyzed by FTIR, XPS (X-ray Photoelectron Spectroscopy), or the like. Therefore, the amount of the hydrophobic functional group to the metal atoms in the protection film 13 may be appropriately adjusted.

The film thickness of the protection film 13 according to the present disclosure is preferably 100 nm or less. Most of fluorescence emitted in the scintillators 11 is reflected on the interface between the scintillators 11 to be guided in the scintillators 11 to be transmitted. This is based on a refractive index difference between the scintillators 11 and air. On the other hand, the refractive index difference between the scintillators 11 and the protection film 13 decreases depending on the composition of the protection film 13. When the scintillators 11 are in contact with the protection film 13, the fluorescence in the scintillators 11 is easily transmitted to the protection film 13. However, when the air is present outside the protection film 13, the fluorescence is totally reflected on the interface between the protection film 13 and the air, so that the fluorescence emitted in the scintillators 11 is guided in a structure containing a combination of the scintillators 11 and the protection film 13. Therefore, when the protection film 13 fills all the gaps between the columnar structure and the next columnar structure of the scintillators 11, the fluorescence spreads to the next columnar structure. However, when the gaps remain, the fluorescence is difficult to spread to the next columnar structure. The gap is 200 nm or more near the tip of the columnar structure described later, and therefore the film thickness is preferably 100 nm or less. The gaps between the columnar structures are not uniform, and therefore the film thickness may be smaller in order to leave the gaps also in narrow gaps.

The protection film 13 according to the present disclosure does not allow the penetration of the water molecules even when the protection film 13 is thin, and therefore can suppress the influence on the scintillators 11. Therefore, the thickness of the protection film 13 can be made smaller than 100 nm. As a result, in the present disclosure, most of fluorescence generated in the scintillators 11 repeats the total reflection or a Fresnel reflection phenomenon, is guided in the scintillators 11 and the protection film 13, is emitted from the tips of the scintillators 11 on the side opposite to the side which the radiation enters, and then enters the light receiving surface. At this time, the fluorescence is efficiently emitted to the vicinity of the position of the foot of the normal line drawn from the light emission point (place where fluorescence is generated) toward the light receiving surface. More specifically, a large number of optical interfaces guide the fluorescence toward the light receiving surface, whereby the spread of the fluorescence can be suppressed. Moreover, since the protection film 13 in the tips of the scintillators 11 is thin, the fluorescence emitted from the tips of the scintillators 11 is prevented from scattering and spreading in the protection film 13. Consequently, the fluorescence generated in the scintillators 11 is efficiently emitted from the tips of the scintillators 11, and then enters the light receiving surface, so that a high spatial resolution is obtained. Since a narrow gap portion is locally present, the protection film 13 with a small thickness is suitable as a waveguide. However, when the protection film 13 is excessively thin, the effect of suppressing the penetration of the water molecules decreases, and therefore the thickness of the protection film 13 is preferably 0.3 nm or more.

The protection film 13 may cover each one of the columnar structures of the scintillators 11 to the depth. More specifically, the protection film 13 may cover each one of the columnar structures of the scintillators 11 to a depth of at least 100 μm from the column tip. However, a portion where the columnar structures of the scintillators 11 are in contact with each other or are close to each other may not be covered with the protection film 13, even when the portion is located in the depth of the columnar structure.

As the hydrophobic functional group of the protection film 13 to be used in the present disclosure, the mass may be 200 g/mol or less. This is because, in the case of a large hydrophobic functional group in which the mass of the hydrophobic functional group exceeds 200 g/mol, large gaps are generated in the protection film 13, so that the permeability of the water molecules increases or the film formation is not achieved due to the steric hindrance by the hydrophobic functional group.

Examples of the hydrophobic functional group usable in the present disclosure include alkyl groups, fluoride alkyl groups, phenyl groups, derivatives thereof, and the like.

These functional groups have low affinity with the water molecules. Therefore, when these functional groups are present in the protection film 13, the energy required when the water molecules penetrate the inside of the protection film 13 increases, so that the permeability of the water molecules through the protection film 13 decreases. When less bulky functional groups, such as a methyl group, an ethyl group, and a propyl group, among the alkyl groups are used, the formation of the protection film 13 is easy. This is because the film formation rate increases and the molecular weight of raw materials decreases due to less bulky and less steric hindrance, and therefore a high concentration raw material vapor can be generated even at low temperatures. Conversely, the film formation of the protection film 13 becomes difficult when the hydrophobic functional group becomes larger.

For the metal atoms contained in a certain atomic group in the protection film 13, Si, Al, Ti, Zr, and the like are usable. These metal atoms are bonded to metal atoms of the other group through an oxygen atom. Moreover, a hydrogen atom, a halogen atom, a hydroxyl group, an alkoxy group, an acetoxy group, and the like may be included in the protection film 13 in addition to the oxygen atom and the hydrophobic functional group. However, when a large amount of these atoms and functional groups are contained, the film formation becomes difficult or the water permeability of the protection film 13 increases. Therefore, the stoichiometric ratio to the metal atoms is preferably 1 times or less.

Film Formation Method of Protection Film

The protection film 13 according to the present disclosure can be formed by bringing molecules in which a hydrophobic functional group and an active group are bonded to each other into contact with the scintillators 11 of the columnar structures held on the scintillator substrate 12 and metal. Examples of the active group include alkoxy groups, halogen atoms, acetoxy groups, hydroxyl groups, and the like. The alkoxy groups, the halogen atoms, the acetoxy groups, and the like can cause a film formation reaction by being activated by the application of a stimulus, such as heat, plasma, or a chemical reaction. By appropriately performing the activation of these active groups, each of the columnar structures of the scintillators 11 can be covered up to the depth with the protection film 13. By covering the same to the depth, the inhibition of the deterioration of the scintillators 11 can be expected even in the case of a smaller film thickness. When the activity is excessively high, the film formation reaction occurs before raw materials reach the depth of the scintillators 11, so that the raw materials cannot reach the depth. As a result, before covering the scintillators 11 with the protection film 13 with a small thickness, the protection film with a large thickness is formed.

Scintillator

The scintillators 11 in the present disclosure are formed on the scintillator substrate 12, are crystal bodies of a plurality of columnar structures projecting from the surface of the scintillator substrate 12, and emit fluorescence by irradiation with radiation typified by X-rays. More specifically, the scintillator 11 is a phosphor which absorbs the energy of incident radiation, such as X-rays, and emits light with a wavelength in the range of 300 nm to 800 nm, i.e., light from ultraviolet light to infrared light with so-called visible light as the center. The major axis of the columnar structure may vertically cross the scintillator substrate 12 but does not need to be strictly vertical and may be inclined. The effects of the present disclosure are hardly influenced by the fact that the major axis is not strictly vertical. The fluorescence emitted by the scintillators 11 needs to be guided to the light receiving surface while propagating in the scintillators 11. Therefore, the angle formed by the major axis of each scintillator 11 and the normal line of the scintillator substrate 12 is preferably less than 45°. Moreover, the inclinations of the plurality of scintillators 11 may not be uniform. Due to the features, the plurality of scintillators 11 includes a large number of optical interfaces in which the angle to the normal line of the scintillator substrate 12 is less than 45°.

The columnar structure may be a cylindrical structure or may be a polygonal structure insofar as the scintillator 11 has the columnar structure. Moreover, the columnar structures do not need to be uniform and the plurality of scintillators 11 may include the scintillators 11 of a cylindrical shape and a polygonal shape. Furthermore, the thicknesses of the scintillators 11 do not need to be uniform and the plurality of scintillators 11 may include the scintillators 11 different in thickness. The thickness of each scintillator 11 is preferably 0.1 µm or more and 50 µm or less and more preferably 0.1 µm or more and 15 µm or less. When the thickness of the scintillator 11 is less than 0.1 µm, the thickness of the scintillator 11 is excessively small as compared with the wavelength of fluorescence generated in the scintillator 11. Therefore, geometric optical diffraction or optical scattering becomes difficult to be caused, so that the fluorescence is hard to be guided toward the light receiving surface. Therefore, the fluorescence spreads to the outside of the scintillators 11, which causes a reduction in the spatial resolution in the radiation detector. On the other hand, the scintillator plate 10 is theoretically difficult to resolve one having a size smaller than the thickness of the scintillators 11. Therefore, when the thickness of the scintillators 11 is larger than 50 µm, the thickness becomes a factor of reducing the spatial resolution not only in a high spatial frequency region, such as 10 LP/mm, but in a low spatial frequency region, such as 1 LP/mm.

The thicknesses of the scintillators 11 do not need to be uniform. A change in the thickness from one end to the other end is preferably 50 µm or less. However, in the present disclosure, the columnar structure includes a needlelike structure having a tapered tip. When each scintillator 11 has the needlelike structure, the tip (end portion on the side opposite to the side contacting the scintillator substrate 12) of the scintillator 11 is 50 µm or more thinner than the other portions, which may be acceptable. The shapes of the cross sections may not be uniform from one end to the other end. For example, the shape of the scintillator 11 which has a polygonal shape in a portion where the distance between the scintillator 11 and the scintillator substrate 12 is short may become a cylindrical shape as the distance between the scintillator 11 and the scintillator substrate 12 increases.

The length (height) of the scintillator 11 is the length of the major axis of the columnar structure. A variation in the length of the plurality of scintillators 11 may be small and the length may not vary (length is uniform). However, the lengths do not necessarily need to be uniform. The plurality of scintillators 11 may include the scintillators 11 having a long length and the scintillators 11 having a short length. As a reason therefor, even when light leaks out of the end of the short scintillator 11, the light can enter the neighboring scintillator 11 to propagate as it is toward the light receiving surface in the scintillator 11. Therefore, also in the plurality of scintillators 11 in which the long and short scintillators 11 are mixed, the spread of fluorescence can be suppressed, and therefore the scintillators 11 have optical waveguide properties.

The length of the scintillators 11 does not have large influence on the effects of the present disclosure. Even when the length of the scintillators 11 is short or long, the effects of the present disclosure are sufficiently exhibited. Therefore, the length of the scintillators 11 is not particularly limited and is preferably 100 nm or more and 10 cm or less considering a realistic production process. The length of the scintillators 11 is more preferably 1 µm or more and 1 cm or less.

The scintillators 11 may have independent columnar structures in which the mutual distance therebetween is 200 nm or more and 1 µm or less. However, the scintillators 11 may not be completely separated from each other and the optical interfaces may be discontinuously present in a direction crossing the surfaces of the columnar structures of the scintillators 11. Even when the optical interfaces are discontinuously present, the scintillators 11 have optical waveguide properties. Moreover, a plurality of gaps or light scatterers may be present in the scintillators 11. Although fluorescence is scattered by the gaps or the light scatterers, the scattered light can enter the neighboring scintillator 11 to propagate in the scintillator 11 toward the light receiving surface. In this limitation, even when the plurality of gaps or scatterers is provided therein, the scintillators 11 have optical waveguide properties. For the scintillators 11, one in which the columnar tip is planarized may be used. In that case, the unevenness between the scintillators 11 and the light receiving surface decreases, so that it can be expected that fluorescence can be received by the light receiving surface.

As materials forming the scintillators 11, various known scintillator materials are usable. In the present disclosure, the scintillators 11 are covered with the thin protection film 13 and are difficult to be influenced by the water molecules. Therefore, materials which contact the water molecules to deteriorate are usable as the scintillators 11. Specifically, compounds having deliquescence are mentioned. In particular, metal halides may be used. When exposed to the atmosphere, the metal halides are deliquesced, so that the structure is changed. As a result, fluorescence propagating in the scintillators 11 spreads to the outside of the scintillators 11 to reduce the spatial resolution in a radiation detector. The present disclosure may be applied to the scintillators 11 containing materials which can deteriorate by contacting the water molecules to reduce the spatial resolution in a radiation detector without being limited to the deliquescence.

As typical materials among the metal halides, alkali halides, such as CsI, are mentioned. The CsI has high conversion efficiency of an X-ray to visible light, can easily form the scintillators 11 into the columnar structures by vapor deposition, and can lengthen the length of the scintillators 11. The CsI alone does not exhibit sufficient light emission efficiency, and therefore an activator is added. For example, NaI, In, Tl, Li, K, Rb, Na, and the like are usable as the activator.

As raw materials for forming a CsI scintillator containing Tl, additives containing one or more Tl compounds and the CsI are usable. CsI:Tl may be used due to a wide emission wavelength from 400 nm to 750 nm. As the Tl compounds containing one or more Tl compounds, compounds having oxidation numbers of monovalent and trivalent are usable. For example, TlI, TlBr, TlCl, TlF, $TlF_3$, and the like are mentioned. The content of the activator may be prepared to the optimum amount according to the target performance and may be set to 0.01% by mol to 20% by mol based on the CsI.

Furthermore, alkali halides represented by General Formula (1) are usable as materials of the scintillators 11 besides the CsI.

$$M2X1 \cdot \alpha M3X2_2 \cdot \beta M4X3_3 : \gamma A1 \tag{1}$$

In Formula (1) above, M2 is at least one alkali metal atom selected from Li, Na, K, Rb, and Cs, M3 is at least one divalent metal atom selected from Be, Mg, Ca, Sr, Ba, Zn, Cd, Cu, and Ni, M4 is at least one trivalent metal atom selected from Sc, Y, La, Ce, Pr, Nd, Pm, Sm, Eu, Gd, Tb, Dy, Ho, Er, Tm, Yb, Lu, Al, Ga, and In, X1, X2, and X3 each are independently at least one halogen atom selected from F, Cl, Br, and I, A1 is at least one metal atom selected from Eu, Tb, In, Bi, Ce, Tm, Dy, Pr, Ho, Nd, Yb, Er, Gd, Lu, Sm, Y, Tl, Na, Ag, Cu, and Mg, and α, β, and γ represent the numerical value in the range of 0≤α≤0.5, 0≤β<0.5, and 0<γ≤0.2, respectively.

Moreover, as the scintillators 11, halide compounds are usable besides the alkali halides mentioned above. Rare earth activated alkaline earth metal fluorohalides represented by the following general formula (2) are also usable.

$$M5FX4 : \delta A2 \tag{2}$$

In Formula (2) above, M5 is at least one alkaline earth metal atom selected from Ba, Sr, and Ca, A2 is at least one rare earth atom selected from Ce, Pr, Sm, Eu, Tb, Dy, Ho, Nd, Er, Tm, and Yb, X4 is at least one halogen atom selected from Cl, Br, and I, and δ represents the numerical value in the range of 0<z≤0.2.

Moreover, in the present disclosure, compounds other than the halide compounds mentioned above can be used for the scintillators 11. Specifically, a $LnTaO_4$:(Nb, Gd) type, a $Ln_2SiO_5$:Ce type, a LnOX:Tm type (Ln is a rare earth element), $Gd_2O_2S$:Tb, $Gd_2O_2S$:Pr, Ce, $ZnWO_4$, $LuAlO_3$:Ce, $Gd_3Ga_5O_{12}$:Cr, $HfO_2$, and the like are mentioned.

Scintillator Substrate

The scintillator substrate 12 in the present disclosure is a solid capable of holding the plurality of scintillators 11. Substrates built with materials, such as metals and oxides thereof, semiconductors and oxides thereof, glass, and resin, and devices, such as a photodetector, created using the same are usable as the scintillator substrate 12.

Radiation Detector

Figure 2:
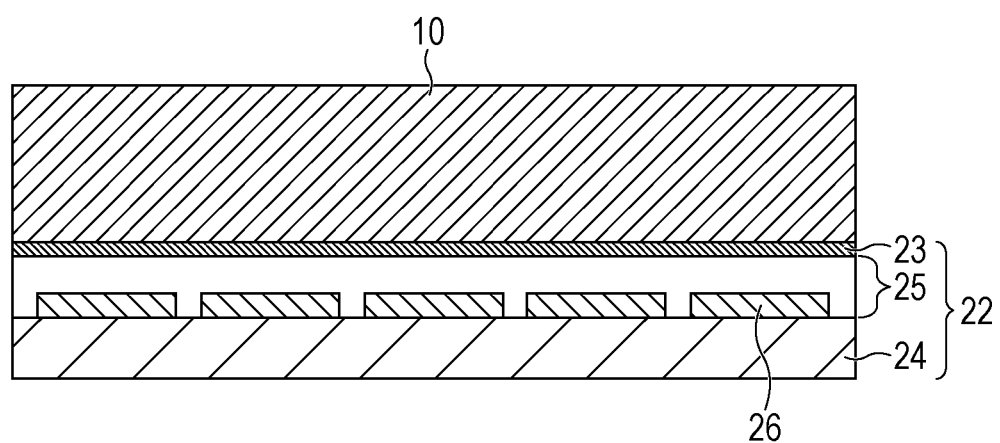
FIG. 2 is a cross-sectional schematic view of one embodiment of a radiation detector of the present disclosure.

A radiation detector provided with the scintillator plate 10 of the present disclosure is described with reference to FIG. 2. FIG. 2 is a cross-sectional view of a radiation detector provided with the scintillator plate 10 of the present disclosure, in which a photoelectric conversion portion 22 is provided in addition to the scintillator plate 10. In FIG. 2, the scintillator plate 10 is disposed so that the scintillator substrate 12 illustrated in FIG. 1 is disposed on the outside. Between the scintillator plate 10 and the photoelectric conversion portion 22, an adhesive layer 23 may be provided. The adhesive layer 23 may have functions of protecting the scintillator plate 10, protecting the photoelectric conversion portion 23, or optically connecting the scintillators 11 and the light receiving surface of the photoelectric conversion portion 22 besides a function of integrating the scintillator plate 10 and the photoelectric conversion portion 22. Moreover, in the adhesive layer 23, different materials may be overlapped in two or more layers.

The photoelectric conversion portion 22 is configured by providing a light detecting layer 25 on the substrate 24. In the light detecting layer 25, a plurality of light receiving portions 26 is arranged. The radiation detector can be manufactured by combining the scintillator plate 10 and the photoelectric conversion portion 22. The radiation detector can be manufactured by directly or indirectly (through the protective layer 13 and the like) forming the scintillators 11 on the photoelectric conversion portion 22, forming the protection film 13, and then combining the scintillator substrate 12 with the side facing the photoelectric conversion portion 22 side of the scintillators 11. However, from the ease of manufacturing, the scintillators 11 may be formed on the scintillator substrate 12, the protection film 13 may be formed to manufacture the scintillator plate 10, and then the scintillator plate 10 and the photoelectric conversion portion 22 may be combined with each other to manufacture the radiation detector.

Moreover, a reflection layer may be provided on the surface opposite to the surface in contact with the photoelectric conversion portion 22 of the scintillator plate 10. While about half of fluorescence generated in the scintillator plate 10 travels to the surface in contact with the photoelectric conversion portion 22, the remaining half thereof travels to the opposite surface. The light can be caused to travel toward the photoelectric conversion portion 22 by the reflection layer, so that the fluorescence reaching the photoelectric conversion portion 22 can be increased. Therefore, the use of the reflection layer can increase the sensitivity to radiation of the radiation detector.

As another radiation detector, the substrate 12 may be the photoelectric conversion portion 22 of FIG. 2 in FIG. 1. In this case, a reflection layer may be provided on the side opposite to the substrate with the scintillators 11 interposed therebetween.

EXAMPLES

On a glass substrate, scintillators were formed by a thermal deposition method. A CsI raw material powder was charged into a heating container in a vacuum chamber, and then a Si substrate was placed on a rotary board so as to face the container. The inside of the vacuum chamber was brought into a high vacuum state with a vacuum pump, and then the CsI was heated. Herein, another container was installed in the vacuum chamber, and then a TlI raw material powder as the light emission center was charged into the container. The container was heated to be subjected to simultaneous film formation. The scintillators were formed on the glass substrate while rotating the substrate. Next, appropriately activated methyltrimethoxysilane was brought into contact with the scintillators, and then a protection film was formed on the scintillator surface, so that a scintillator plate of Example 1 was obtained.

A scintillator plate of Comparative Example 1 was obtained in the same processes as those of Example 1, except not forming a protection film.

The produced sample was subjected to a resolution evaluation by the MTF (Modulation Transfer Function) evaluation by X-ray irradiation. A method in the MTF evaluation is described below. As a technique for evaluating the resolution, a general edge method was used. The MTF measurement was performed using NEO-890Z of Pony Industry Co., Ltd at a tube voltage of 80 kV and a tube current of 0.2 mA.

Figure 3:
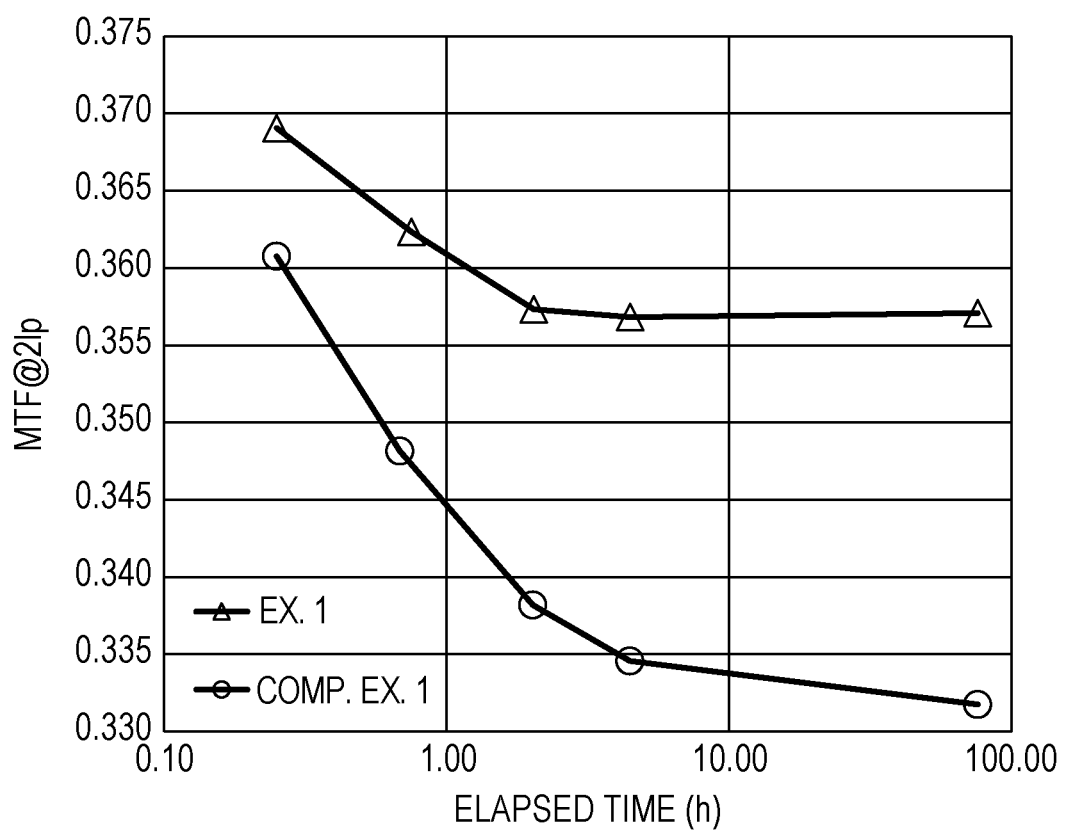
FIG. 3 illustrates changes with time of MTFs of Example 1 and Comparative Example 1.

FIG. 3 illustrates changes with time of the MTF of each of the scintillator plates of Example 1 and Comparative Example 1 when stored in 22° C. and 45% Rh. In Comparative Example 1, the MTF decreases with time, so that the spatial resolution decreases. This is considered to originate from the deliquescence of the CsI.

On the other hand, in Example 1, the MTF reduction stops in the middle of the measurement, and does not change from the point. This is considered to be because the deliquescence of the scintillator 11 was suppressed by the protection film 13. Therefore, it is considered that the deliquescence of the scintillators is sufficiently suppressed even with the thin protection film 13 in the scintillator plate 10 of the present disclosure.

The present disclosure can suppress the influence of water molecules on a scintillator to suppress the deterioration of the scintillator even with a thin protection film. Therefore, the protection film can be made thinner than before, and when fluorescence generated in the scintillator propagates to the scintillator tip, the propagation of the fluorescence to a columnar structure adjacent thereto can be reduced. Moreover, the protection film covering the scintillator tip is also thin, and therefore the amount of fluorescence dispersing from the scintillator tip to the light receiving surface of a pixel can also be reduced. Therefore, the present disclosure can provide a radiation detector having high resolution capable of suppressing the spread of fluorescence generated in the scintillator, and then causing the fluorescence to efficiently enter the light receiving surface of the corresponding pixel. Moreover, in the present disclosure, the deterioration of the scintillator is suppressed with the protection film, and therefore a high spatial resolution in a radiation detector is stably obtained over a long period of time.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-245449 filed Dec. 21, 2017, which is hereby incorporated by reference herein in its entirety.

What is claimed is:

1. A scintillator plate comprising:
a scintillator substrate;
a scintillator formed on the scintillator substrate; and
a protection film covering the scintillator, the scintillator having a plurality of crystal bodies of columnar structures projecting from a surface of the scintillator substrate, wherein
the protection film has at least a plurality of metal atoms, an oxygen atom, and a hydrophobic functional group,
a certain metal atom of the plurality of metal atoms is bonded to another metal atom of the plurality of metal atoms through the oxygen atom,
the hydrophobic functional group has a carbon atom, and
the carbon atom is bonded to any one of the plurality of metal atoms.

2. The scintillator plate according to claim 1, wherein a mass of the hydrophobic functional group is 200 g/mol or less.

3. The scintillator plate according to claim 2, wherein the hydrophobic functional group is selected from the group consisting of an alkyl group, a fluoride alkyl group, a phenyl group, and a derivative of any one of the groups.

4. The scintillator plate according to claim 3, wherein the hydrophobic functional group selected from the group consisting of a methyl group, an ethyl group, and a propyl group.

5. The scintillator plate according to claim 4, wherein the metal atom is selected from the group consisting of Si, Al, Ti, and Zr.

6. The scintillator plate according to claim 5, wherein a stoichiometric ratio of the hydrophobic functional group to the metal atom is 0.1 times or more and twice or less.

7. The scintillator plate according to claim 6, wherein the protection film contains methyltrimethoxysilane.

8. The scintillator plate according to claim 7, wherein a film thickness of the protection film is 0.3 nm or more and 100 nm or less.

9. The scintillator plate according to claim 1, wherein a thickness of the crystal body of the columnar structure is 0.1 μm or more and 50 μm or less.

10. The scintillator plate according to claim 1, wherein the scintillator contains at least a halide compound.

11. The scintillator plate according to claim 10, wherein the halide compound is alkali halide.

12. The scintillator plate according to claim 11, wherein the alkali halide is a compound represented by a following Formula (1),

$$M2X1 \cdot \alpha M3X2_2 \cdot \beta M4X3_3 \cdot \gamma A1 \qquad (1)$$

wherein, in Formula (1), M2 is at least one alkali metal atom selected from the group consisting of Li, Na, K, Rb, and Cs, M3 is at least one divalent metal atom selected from the group consisting of Be, Mg, Ca, Sr, Ba, Zn, Cd, Cu, and Ni, M4 is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga, and In, X1, X2, and X3 each are independently at least one halogen atom selected from the group consisting of F, Cl, Br, and I, A1 is at least one metal atom selected from the group consisting of Eu, Tb, In, Bi, Ce, Tm, Dy, Pr, Ho, Nd, Yb, Er, Gd, Lu, Sm, Y, Tl, Na, Ag, Cu, and Mg, and $\alpha$, $\beta$, and $\gamma$ represent a numerical value in a range of $0 \leq \alpha < 0.5$, $0 \leq \beta < 0.5$, and $0 < \gamma \leq 0.2$, respectively.

13. A radiation detector, comprising:
the scintillator plate according to claim 1; and
a photoelectric conversion portion.

14. A radiation detector comprising:
the scintillator plate according to claim 1; and
a photoelectric conversion portion.

15. A scintillator plate comprising:
a scintillator substrate;
a scintillator formed on the scintillator substrate; and
a protection film covering the scintillator, the scintillator having a plurality of crystal bodies of columnar structures projecting from a surface of the scintillator substrate, wherein
the protection film contains methyltrimethoxysilane.

* * * * *